United States Patent
Wang (10) Patent No.: US 9,191,133 B2
(45) Date of Patent: Nov. 17, 2015

(54) MULTIMEDIA DATA DISTRIBUTION SYSTEM AND OPERATING METHOD THEREOF

(71) Applicant: HTC Corporation, Taoyuan County (TW)

(72) Inventor: Huai-Yuan Wang, Bellevue, WA (US)

(73) Assignee: HTC Corporation, Taoyuan (TW)

( * ) Notice: Subject to any disclaimer, the term of this patent is extended or adjusted under 35 U.S.C. 154(b) by 321 days.

(21) Appl. No.: 13/778,159

(22) Filed: Feb. 27, 2013

(65) Prior Publication Data

US 2013/0231044 A1 Sep. 5, 2013

Related U.S. Application Data

(60) Provisional application No. 61/605,728, filed on Mar. 1, 2012.

(51) Int. Cl.
*H04H 40/00* (2009.01)
*H04H 20/72* (2008.01)
(Continued)

(52) U.S. Cl.
CPC .............. *H04H 20/72* (2013.01); *H04W 8/005* (2013.01); *H04W 12/06* (2013.01); *H04W 84/12* (2013.01)

(58) Field of Classification Search
CPC ..... H04W 12/06; H04W 67/18; H04W 16/16; H04W 48/18
USPC .............. 455/3.06, 3.01–3.05, 518, 519, 500, 455/517, 509, 414.1–414.4, 426.1, 426.2, 455/403, 422.1, 445, 550.1, 416, 455/456.1–457, 7, 11.1, 466; 370/259–262, 370/265, 310, 328, 329, 343
See application file for complete search history.

(56) References Cited

U.S. PATENT DOCUMENTS 8,892,722 B1 * 11/2014 Kopikare et al. ............. 709/224
2007/0217436 A1 9/2007 Markley et al.
(Continued)

FOREIGN PATENT DOCUMENTS

| CN | 102176760 | 9/2011 |
|---|---|---|
| CN | 102224751 | 10/2011 |

OTHER PUBLICATIONS

"Office Action of Taiwan Counterpart Application", issued on Apr. 29, 2015, p1-p6, in which the listed references were cited.
(Continued)

*Primary Examiner* — Keith Ferguson
(74) *Attorney, Agent, or Firm* — Jianq Chyun IP Office (57) ABSTRACT

A multimedia data distribution system is provided. The multimedia data distribution system comprises a multimedia controller and at least a distribution zone. A distribution zone has a zone hub and zero to finite number of zone media player. The zone hub receives multimedia data from a multimedia content source through an out-of-zone data path and then synchronously redistributes multimedia contents to rest of zone media players via in-zone data paths. A multimedia controller utilizes out-of-zone control path to transmit control message to a zone hub, which in turn relays the control messages to addressed zone media player(s) via in-zone control paths. The zone hub of a distribution zone receives status updates from individual zone media players via in-zone status update paths, aggregates them, and then relays to the multimedia controller via the out-of-zone status update path. While out-of-zone data, control, and status update paths are setting up based on Wi-Fi connections to an infrastructure AP or a Hotspot, all of the in-zone paths are established on Wi-Fi Direct peer-to-peer connections.

23 Claims, 6 Drawing Sheets

(51) Int. Cl.
*H04W 8/00* (2009.01)
*H04W 12/06* (2009.01)
*H04W 84/12* (2009.01)

(56) References Cited

U.S. PATENT DOCUMENTS

2010/0124196 A1* 5/2010 Bonar et al. .................. 370/329
2011/0149806 A1 6/2011 Verma et al.
2011/0294502 A1* 12/2011 Oerton ....................... 455/426.1
2013/0194962 A1* 8/2013 Abraham et al. ............. 370/254

OTHER PUBLICATIONS

"Office Action of China Counterpart Application," issued on Jul. 2, 2015, p1-p7, in which the listed references were cited.

* cited by examiner

Directly sending a control message through the control path — S701

FIG. 7

Directly sending the status update message by each of the zone media players to the multimedia controller through direct status update paths respectively — S801

FIG. 8

Sending probe requests by the multimedia controller on a plurality of Wi-Fi — S901

Sending a probe requests by each of the zone media players to the zone hub in response to the probe requests listened by each of the zone media players in the Wi-Fi respectively — S905

MULTIMEDIA DATA DISTRIBUTION SYSTEM AND OPERATING METHOD THEREOF

CROSS-REFERENCE TO RELATED APPLICATION

This application claims the priority benefit of U.S. provisional application Ser. No. 61/605,728, filed on Mar. 1, 2012. The entirety of the above-mentioned patent application is hereby incorporated by reference herein and made a part of this specification.

BACKGROUND OF THE INVENTION

1. Field of Invention

The present invention relates to a wireless multimedia data distribution system and an operating method of the distribution system. More particularly, the present invention relates to a multimedia data distribution system and an operating method of the multimedia data distribution system.

2. Description of Related Art

Wireless Fidelity (Wi-Fi) is a popular wireless networking technology that allows electronic devices to exchange data wirelessly (using radio waves) through either an infrastructure Access Point (AP) or peer-to-peer connections over a local area network while enabling high-speed Internet connections. In an infrastructure AP based Wi-Fi multimedia data distribution system, all multimedia devices must be connected to an infrastructure AP. The source device first transmits multimedia contents to the infrastructure AP it is associated with, and the infrastructure AP in turn redirects the multimedia content to the intended destination device(s).

Therefore, for a conventional Wi-Fi data distribution system to operate, each of the devices needs to have a public IP address and a Wi-Fi infrastructure AP must be presented in the system. In other words, a Wi-Fi infrastructure AP based multimedia data distribution system will not be able to function when Wi-Fi infrastructure AP is absent.

SUMMARY OF THE INVENTION

The present invention describes a general-purpose multimedia data distribution system and an operating method of the multimedia data distribution system that enables multimedia data transmission, control message transmission, and status update message transmission independent from the existence of a Wi-Fi infrastructure AP. The architecture, configuration, and operation method of the general multimedia data distribution system are applicable to the specific enablement of a Wireless Multi-Room Audio (WMRA) distribution system.

The present invention provides a multimedia data distribution system. The multimedia data distribution system comprises content source, a multimedia controller, and at least one distribution zone. A distribution zone, which is a logical cluster of Wi-Fi device(s), has one device known as the zone hub and zero to finite number of non-zone-hub devices known as the zone media players. The zone hub receives multimedia data from a multimedia content source, which can be the multimedia controller itself or an Internet media source, through an out-of-zone data path. The zone hub then redistributes multimedia data synchronously or asynchronously to all the zone media players in its distribution zone through in-zone data path(s). The out-of-zone data path can be a Wi-Fi connection to an infrastructure AP, or a Hotspot, or a peer device while each of the in-zone data paths is a Wi-Fi Direct peer-to-peer connection. The multimedia controller controls distribution zone operations and receives distribution zone status updates via control and status update paths, respectively. Control and status update paths are both established based on some type of Wi-Fi connections.

The invention further provides a method to implement control and status update paths based on Bluetooth Low Energy (BLE). In one embodiment, the multimedia controller establishes BLE data channel connections with the zone hub and each of the zone media players. The control and status update messages are sent directly between the multimedia controller and the zone hub/zone media players. In another embodiment, both control and status update paths are established using directed or undirected BLE advertisement broadcasts.

The invention also provides a configuration of the multimedia data distribution system that comprises a multifunctional central device (MCD) and at least one zone media player. This multimedia distribution system is centered on the MCD device having the combined functionalities of a multimedia controller, a multimedia content source, and a zone hub. An in-zone data path, which is a Wi-Fi Direct peer-to-peer connection, is established between the zone hub and each of the zone media players. The in-zone control and status update paths are also based on Wi-Fi Direct peer-to-peer connections between the zone hub and individual zone media player(s). The zone hub relay control messages to each of the zone media players and status update messages back to the multimedia controller. The out-of-zone data, control, and status update paths are internal to the MCD. The MCD provides Internet connectivity to the distribution zone via infrastructure AP or wide area network (WAN) connections.

In the present invention, the multimedia data transmission, the control message transmission, the status update operation and the discovery operation of the multimedia data distribution system are operated in absence of an infrastructure access point. Further, the connections for transmitting signals between the controller, the zone hub and the zone media players may be established in different ways based on network topology and device capabilities.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

A multimedia data distribution system, such as a wireless multi-room audio (WMRA) system, comprises a content source, a multimedia controller, and at least one distribution zone (a.k.a. speaker zone or music zone in WMRA system). A distribution zone is usually created by a user using the multimedia controller and consists of one zone hub (a.k.a. zone master in WMRA system) and zero to finite number of zone media players (a.k.a. zone slaves in WMRA system). The structure of a distribution zone closely resembles the star networking topology, in which the zone hub acts as the central node of the subnet. The zone hub connects to a content source, which may be the multimedia controller itself or a content server residing in the Internet, via Wi-Fi connection with an infrastructure AP, a Wi-Fi Hotspot, or a Wi-Fi peer device. When in operation, the zone hub receives music content from a user selected content source and synchronously redistributes to all zone media players in the distribution zone over Wi-Fi Direct peer-to-peer connections. A specialized media controller or a display-capable computing device, such as smartphone, tablet, or laptop computer, is used to control the formation and operation of a distribution zone. The media controller asserts control over an entire distribution zone or individual zone media players by sending control messages over the in-zone control path to the zone hub, which in turn relays to individual zone media players via in-zone control paths. Zone hub receives status update messages from individual zone media players inside the distribution zone via in-zone status update paths and relays aggregated status update messages to the multimedia controller via out-of-zone status update path. The out-of-zone data, control, and status updates paths are established over Wi-Fi connections to an infrastructure AP, or a Hotspot, or a peer-to-peer device. The in-zone data, control, and status update paths are all based on Wi-Fi Direct peer-to-peer connections.

Figure 1:
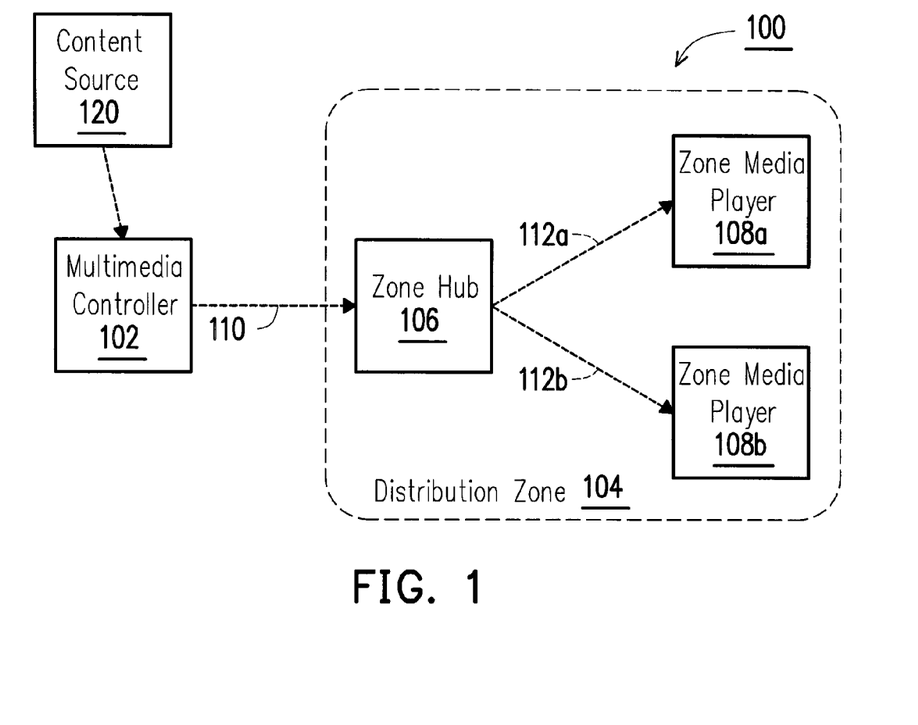
FIG. 1 is a schematic diagram showing a multimedia data distribution system according to one embodiment of the present invention.

FIG. 1 is a schematic diagram showing a multimedia data distribution system according to one embodiment of the present invention. As shown in FIG. 1, the multimedia data distribution system 100 comprises a multimedia controller 102 and at least one distribution zone 104. Noticeably, the multimedia controller 102 controls the formation, operation, and dissolution of individual distribution zones. Moreover, the multimedia controller 102 can be, for example, a display-capable portable device in any shape or form factor, such as smartphone, tablet, or laptop computer. Also, the multimedia controller 102 can be, for example, a content source providing various kinds of multimedia data (such as audio data, video data and audio-video data) and having ability of controlling multimedia data. Alternatively, the multimedia controller 102, for example, can be connected with the content source (such as a cloud server 120 shown in FIG. 1) through an infrastructure Wi-Fi connection or a wide area network (WAN) connection.

Furthermore, in each of the distribution zones 104 of the multimedia data distribution system 100, there is a zone hub 106 and zero to finite number of zone media players 108 (such as the zone media players 108a and 108b). A distribution zone 104 operates as a Wi-Fi Direct peer-to-peer group with the zone hub 106 acting as the P2P Group Owner (GO). The zone hub 106 can be, for example, a speaker, a display device, a multimedia player or a portable device (including smart phone, a personal digital assistant, a tablet PC or a laptop) or any electronic device supporting the Wi-Fi Direct peer-to-peer function. Further, each of the zone media players 108 can be, for example, a speaker, a display device, a multimedia player or a portable device (including smart phone, a personal digital assistant, a tablet PC and a laptop) or any electronic device supporting the Wi-Fi Direct peer-to-peer function. In the present embodiment shown in FIG. 1, there are two zone media players 108a and 108b in the distribution zone 104. However, the number of the zone media players 108 in the distribution zone 104 does not limit the scope of the present invention.

Moreover, as shown in FIG. 1, an out-of-zone data path 110 is established between the zone hub 106 and the multimedia controller 102. The out-of-zone data path 110 can be, for example, a Wi-Fi connection through an infrastructure AP, or Wi-Fi Hotspot, or a Wi-Fi peer-to-peer device (such as Wi-Fi Direct or Wi-Fi IBSS). Also, in-zone data paths are established between the zone hub 106 and each of the zone media players 108. For instance, the in-zone data path 112a is established between the zone hub 106 and the zone media player 108a and the in-zone data path 112b is established between the zone hub 106 and the zone media player 108b. It should be noticed that each of the in-zone data paths 112a and 112b is a Wi-Fi Direct peer-to-peer connection. That is, according to the Wi-Fi Direct spec, a pair of electronic devices with Wi-Fi peer-to-peer connection can directly transfer data between each other.

Figure 2:
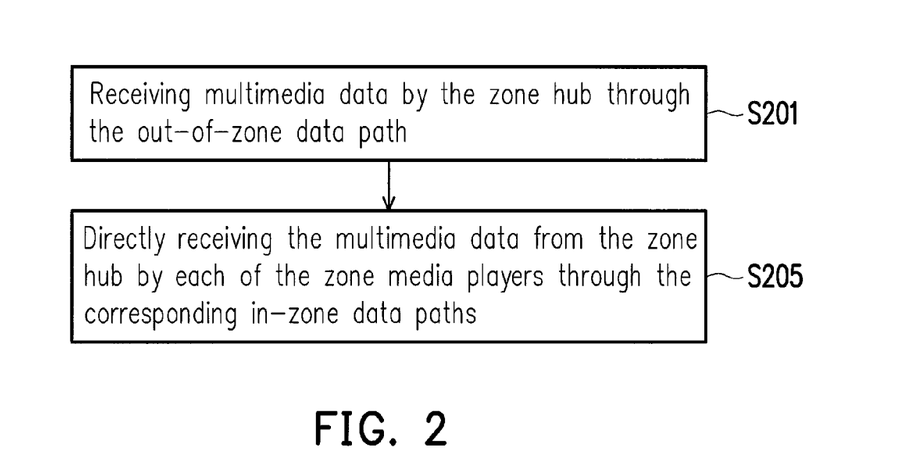
FIG. 2 is a flow chart illustrating multimedia data transmission operation of a distribution zone according to one embodiment of the present invention.

FIG. 2 is a flow chart illustrating multimedia data transmission operation of a distribution zone according to one embodiment of the present invention. In multimedia data distribution system 100 as illustrated in FIG. 1, the zone hub 106 receives multimedia data sent from a multimedia content source, which can be the multimedia controller 102 or an Internet media source, through the out-of-zone data path 110 (the step S201) and synchronously re-distribute the received multimedia data to all the zone media players 108a and 108b through in-zone data paths 112a and 112b respectively (the step S205).

In the proceeding embodiment, the topology of the multimedia data distribution system 100, the multimedia data transmission connections (including the data paths between the multimedia controller 102 and the zone hub 106 and between the zone hub 106 and each of the zone media players 108) and the multimedia data transmission operation of the multimedia data distribution system 100 are described. In the subsequent embodiments, the control and status update message transmission connections of the multimedia data distribution system 100, the control message transmission operation and the status updating operation of the multimedia data distribution system 100 are further illustrated with Figures.

Figure 3:
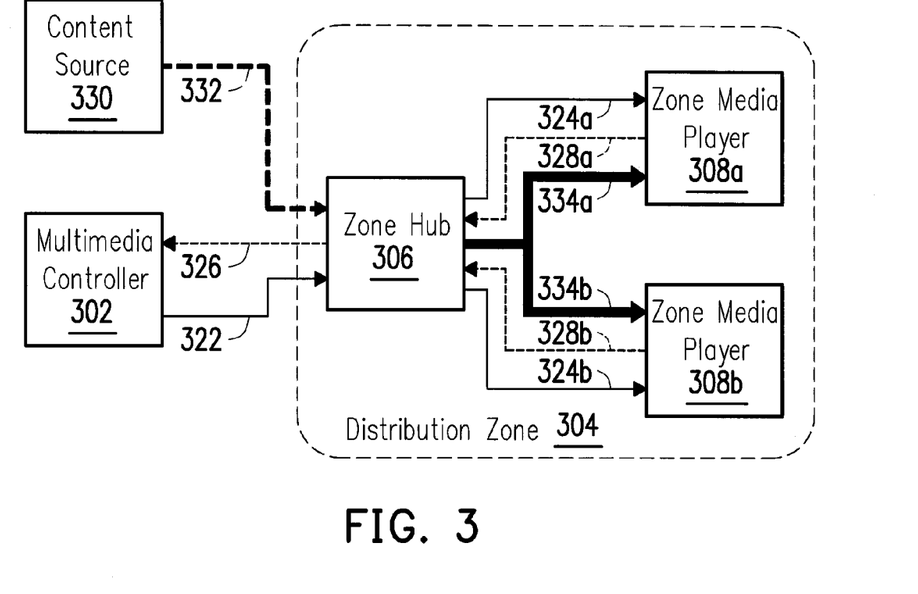
FIG. 3 is a schematic diagram showing data paths, control paths, and status update paths of a multimedia data distribution system according to one embodiment of the present invention.

FIG. 3 is a schematic diagram showing data paths, control paths, and status update paths of a multimedia data distribution system according to one embodiment of the present invention. The thick dashed line 332 represents the out-of-zone data path that connects a content source to a zone hub. The thick solid lines 334a and 334b represent the in-zone data paths between the zone hub 306 and zone media player 308a and 308b, respectively.

The thin solid line 322 represent out-of-zone control path from multimedia controller 302 to the zone hub 306 and the pair of thin solid lines 324a and 324b represent in-zone control paths between zone hub 306 and each of the zone media player 308a and 308b, respectively. Further, the out-of-zone control path 322 can be, for example, a Wi-Fi bidirectional data connection established through an infrastructure AP, or a Wi-Fi Hotspot, or a Wi-Fi peer-to-peer device. In practice, the control message can be delivered to the zone hub 306 using Wi-Fi MAC (Medium Access Control) protocol or higher layer protocols such as TCP/IP (Transport-Control-Protocol/Internet-Protocol). In contrast, in-zone control paths 324a and 324b are established directly between the zone hub 306 and respective zone media players 308a and 308b over Wi-Fi Direct peer-to-peer connections. When a control message arrives at the zone hub 306 via the out-of-zone control path 322, the zone hub 306 first determines whether the control message is destined to itself, or a specific zone media player, or the entire distribution zone. A control message destined to the zone hub will be terminated at the zone hub 306. A control message destined to a specific zone media player will be relayed to the zone media player by the zone hub 306 over in-zone control path 324a or 324b. A control message destine to the entire distribution zone can either be relayed to each zone media player individually or broadcasted to them altogether.

In addition, the thin dashed lines 328a and 328b represent in-zone status update paths running respectively from zone media player 308a and 308b to zone hub 306 while the thin dashed line 326 is representing the out-of-zone status update path from zone hub 306 back to the multimedia controller 302. Moreover, each of the in-zone status update paths 328a and 328b is respectively established between the zone hub 306 and each of the zone media players 308a and 308b over Wi-Fi Direct peer-to-peer connections. The zone hub 306 aggregates status update messages received from individual zone media players 308a and 308b and relays to the multimedia controller 302 periodically via the out-of-zone status update path 326. Further, the out-of-zone status update path 326 is established between the zone hub 306 and the multimedia controller 302 over a Wi-Fi data connection through an infrastructure AP, or a Wi-Fi Hotspot, or a Wi-Fi peer-to-peer device as previously mentioned. In practice, the status update message from the zone hub 306 can be delivered to the multimedia controller 302 using, for example, Wi-Fi MAC (Medium Access Control) protocol or higher layer protocols such as TCP/IP (Transport-Control-Protocol/Internet-Protocol).

It should be noticed that, the multimedia data distribution system as shown in FIG. 3 could have many variations in actual implementation. In one embodiment, the out-of-zone data path 332 may have to be routed through the multimedia controller in case an infrastructure AP is absent. In another embodiment, the content source 330 and the multimedia controller 302 may collocate in the same physical entity. In yet another embodiment, the content source 330, the multimedia controller 302, and the zone hub 306 can all be integrated into a single physical device of any shape and form factor. More clearly, the functionalities of a multimedia controller 302, a content source 330, and a zone hub 306 may be carried out by separate entities of distinct functionalities or by an integrated entity capable of performing multiple roles at the same time. In the present embodiment shown in FIG. 3, the out-of-zone data path 332, the out-of-zone control path 322, and the out-of-zone status update path 326 are all based on Wi-Fi connection(s) to either an infrastructure AP or a Hotspot. Meanwhile, the in-zone data paths 334a/334b, the in-zone control paths 324a/324b, and the in-zone status update paths 328a/328b are all based on Wi-Fi Direct peer-to-peer connections. This networking model requires zone hub 306 to engage in concurrent STA/GO (Station/Group Owner) operation.

Figure 4:
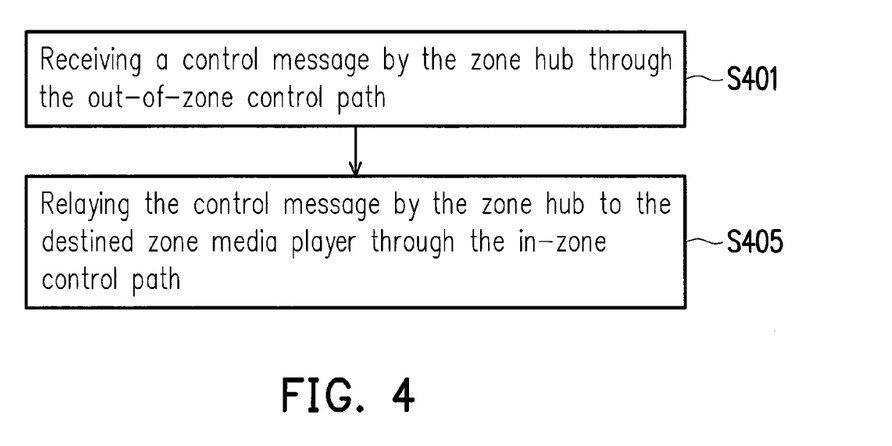
FIG. 4 is a flow chart illustrating a control message transmission operation of the multimedia data distribution system with the control paths shown in FIG. 3 according to one embodiment of the present invention.

FIG. 4 is a flow chart illustrating a control message transmission operation of the multimedia data distribution system with the control paths shown in FIG. 3 according to one embodiment of the present invention. When a control message (such as the control message for tuning down the volume of one of the zone media players 308) arrives at the zone hub 306 from the multimedia controller 302 through the out-of-zone control path 322 (the step S401), the zone hub 306 will timely relay the message to addressed zone media player 308a or 308b through in-zone control path 324a or 324b (the step S405).

Figure 5:
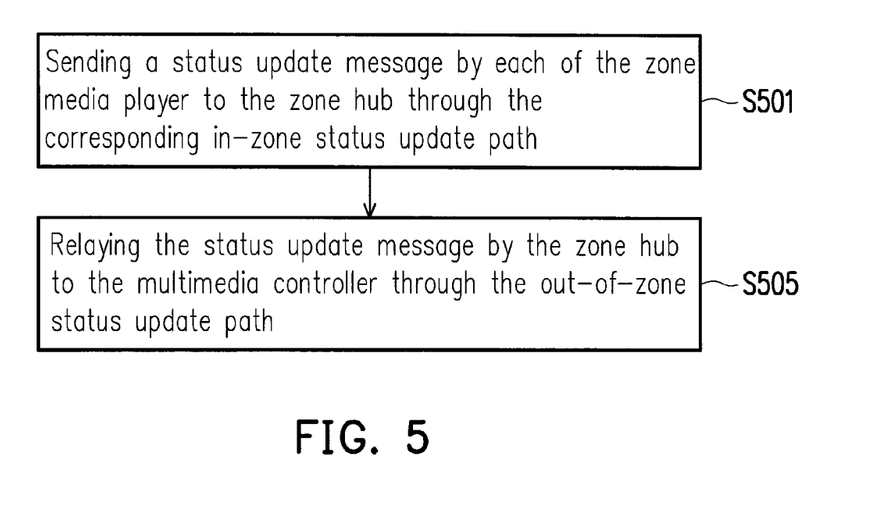
FIG. 5 is a flow chart illustrating a status updating operation of the multimedia data distribution system with the status update paths shown in FIG. 3 according to one embodiment of the present invention.

FIG. 5 is a flow chart illustrating a status updating operation of the multimedia data distribution system with the status update paths shown in FIG. 3 according to one embodiment of the present invention. In the step S501, the zone media player 308a and 308b each sends status update messages to the zone hub 306 via respective in-zone status update path 328a and 328b. In the step S505, the zone hub 306 aggregates status update messages received from individual zone media players (308a and 308b) and relay to the multimedia controller 302 via out-of-zone status update path 326.

Figure 6:
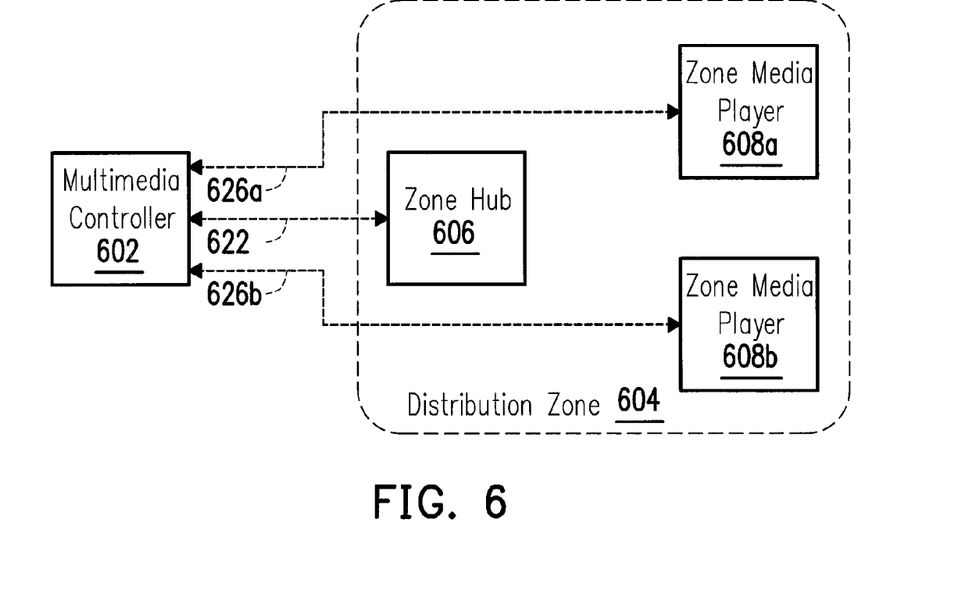
FIG. 6 is a schematic diagram showing control paths and data paths of a multimedia data distribution system according to another embodiment of the present invention.

FIG. 6 is a schematic diagram showing control paths and status update paths of a multimedia data distribution system according to another embodiment of the present invention. As shown in FIG. 6, dotted lines 622, 626a, and 626b represent the control and status update paths that run from the multimedia controller 602 directly to the zone hub 606, the zone media player 608a, and the zone media player 608b, respectively. In other words, there is a direct control and status update path between multimedia controller 602 and each of the nodes (606, 608a, and 608b) in the distribution zone. In contrast to the control and status update scheme shown in FIG. 3, the control and status update scheme illustrated in FIG. 6 do not require the zone hub 606 to relay control messages and status update messages between multimedia controller 602 and zone media players 608a and 608b.

In one embodiment, the control and status update paths 622, 626a, and 626b are all based on bidirectional Bluetooth Low Energy (BLE) data channel connections. In this embodiment, the multimedia controller 602 establishes BLE data channel connections with the zone hub 606 and each of the zone media players 608a and 608b. Further, the control messages and status update messages are sent directly between the multimedia controller 602 and the zone hub 606/zone media players 608a and 608b without being relayed through the zone hub 606. More clearly, the control messages and status update messages are encoded in the payloads of BLE data channel PDU (Protocol Data Unit) packets. The multimedia controller 602 is the Master of all the BLE data channel connections while zone hub 606 and zone media players 608a and 608b are the slaves of their respective connections. The multimedia controller 602 determines the connection event interval for each of the BLE data channel connections. During each connection event, the master (multimedia controller 602) will first transmit a data channel PDU to the slave, which may carry a control message or be Null if there is no control message to be sent. The slave, upon receiving the data channel PDU from the master, will in turn transmits a data channel PDU back to the master, which may carry status update message or be Null if no status update is available. According to another embodiment, the control and status update paths may all be based on directed or undirected BLE advertisement broadcasts.

Figure 7:
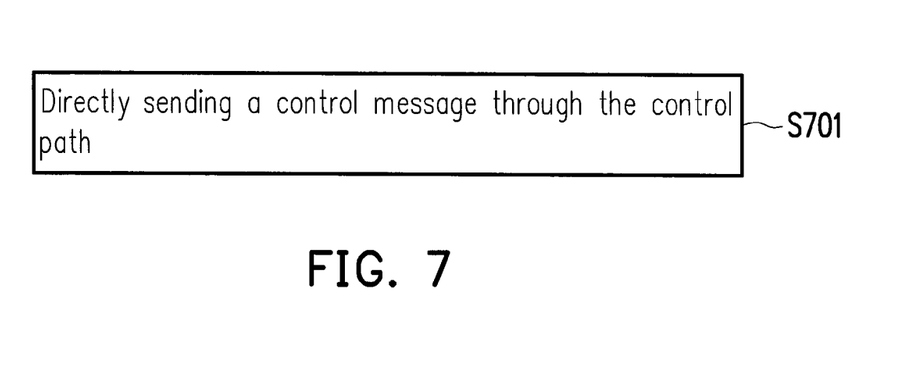
FIG. 7 is a flow chart illustrating a control message transmission operation of the multimedia data distribution system with the control and status update paths shown in FIG. 6 according to one embodiment of the present invention.

FIG. 7 is a flow chart illustrating a control message transmission operation of the multimedia data distribution system with the control and status update paths shown in FIG. 6 according to one embodiment of the present invention. When the multimedia controller 602 needs to send a control message (such as the control message for tuning down the volume of the zone media players 608a) to the zone media player 608a, the control message is sent directly through control path 626a (the step S701).

Figure 8:
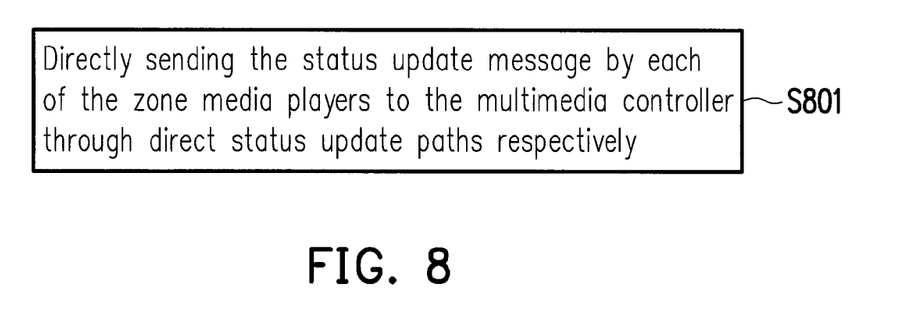
FIG. 8 is a flow chart illustrating a status updating operation of the multimedia data distribution system with the control and status update paths shown in FIG. 6 according to one embodiment of the present invention.

FIG. 8 is a flow chart illustrating a status updating operation of the multimedia data distribution system with the status update paths shown in FIG. 6 according to one embodiment of the present invention. As shown in FIG. 8, in the status updating operation, each of the zone media players 608a and 608b directly sends the status update message to the multimedia controller 602 through direct status update paths 626a and 626b, respectively (S801).

Figure 9:
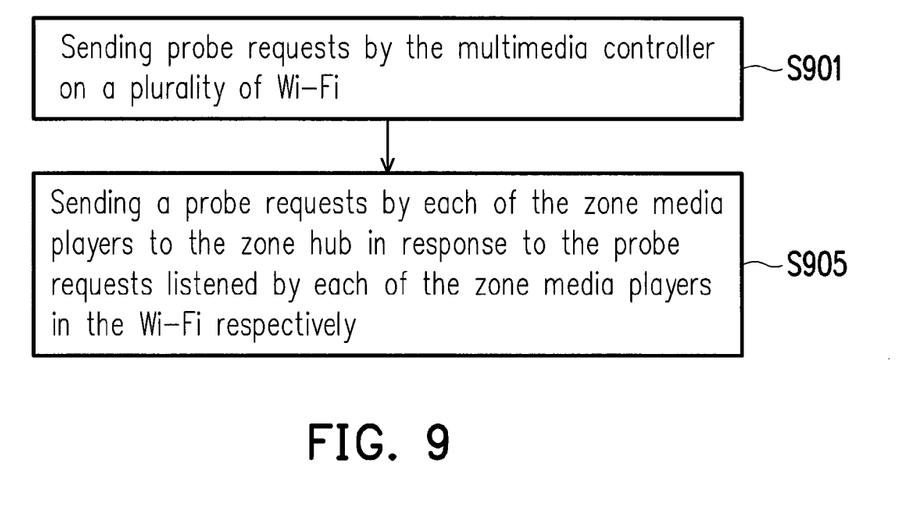
FIG. 9 is a flow chart illustrating a discovery operation of the multimedia data distribution system according to one embodiment of the present invention.

Besides the multimedia data transmission operation, the control message transmission operation and the status updating operation, the operating method of the multimedia data distribution system of the present invention further comprises a discovery operation. FIG. 9 is a flow chart illustrating a discovery operation of the multimedia data distribution system according to one embodiment of the present invention. The discovery operation of a multimedia controller closely resembles the Wi-Fi Direct discovery procedures. The behaviors of wireless media players during discovery, however, depend on whether the media player is associated with a zone hub in a distribution zone. In order to speed up the discovery, wireless media players that have not associated with any distribution zone will only passively await incoming probe requests on one of the Wi-Fi Direct social channels instead of performing their own active scans. The wireless media players that have associated with a distribution zone and thereby became zone media player will neither listen nor respond to incoming probe requests according to the Wi-Fi Direct spec. Instead, the corresponding zone hub will respond to probe requests on their behalves. As shown in FIG. 9, in the discovery operation of the present embodiment, the multimedia controller sends a series of probe requests on a plurality of Wi-Fi channels (the step S901), including channel 1, channel 6 and channel 11, for example. Further, the probe requests can carry proprietary information of the multimedia controller, which includes unique and user-friendly controller name, or Wi-Fi capability, or other specific information about the intended multimedia data distribution system. At the time the multimedia controller sends probe requests on the predetermined listen channels, wireless media players not associated with any distribution zone passively await the probe requests on one of the predetermined listen channels and respond with a probe response upon reception of a probe request (the step S905). The probe response can also carry proprietary information about the responding media player. Moreover, the probe responses sent from a zone hub will also contain specifics about the zone media players current associated with zone hub.

Figure 10:
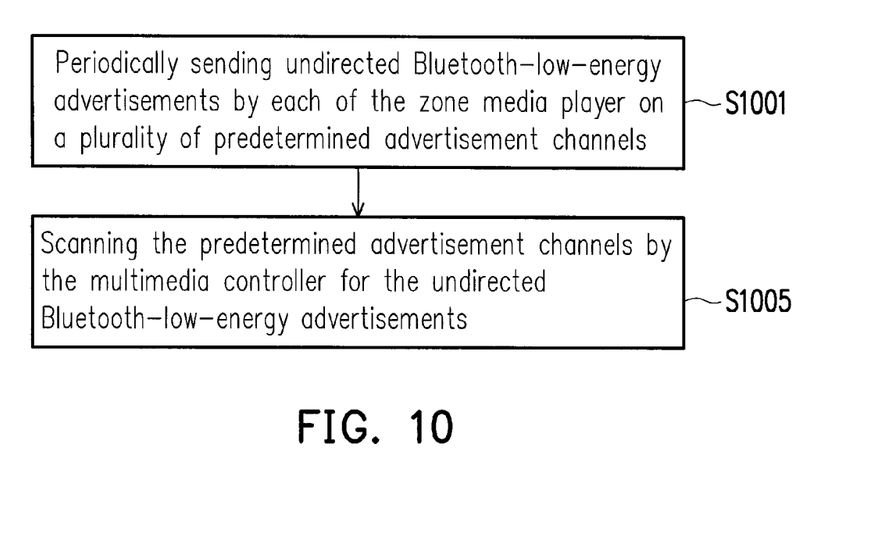
FIG. 10 is a flow chart illustrating a discovery operation of the multimedia data distribution system according to another embodiment of the present invention.

FIG. 10 is a flow chart illustrating a discovery operation of the multimedia data distribution system according to another embodiment of the present invention. The discovery operation of the present embodiment closely resembles the BLE advertisement mechanism. Each wireless speaker periodically transmits BLE advertisement packets over a plurality of predefined BLE advertisement channels. The multimedia controller, in searching for wireless zone media players, listens to incoming BLE advertisement packets on the BLE advertisement channels. As shown in FIG. 10, according to the BLE advertisement mechanism, in the discovery operation of the present embodiment, each of the zone hubs and zone media players periodically sends undirected BLE advertisement packets on a plurality of predetermined BLE advertisement channels (the step S1001). The predetermined BLE advertisement channels include channel 37, channel 38 and channel 39, for example. Furthermore, the undirected BLE advertisement packet can, for example, carry the proprietary information of the corresponding zone hub and zone media player, which may include unique and user-friendly player name and/or other information relevant to the advertising device. In the step S1005, the multimedia controller, in searching for wireless zone media players, listens to the BLE advertisement packets on all of the predetermined BLE advertisement channels and decodes proprietary information carried in the corresponding undirected BLE advertisement packets.

Taking Wireless Multi-Room Audio (WMRA) distribution system as an exemplary embodiment, the WMRA system comprises a content source, a media controller (i.e. multimedia controller) and at least one speaker zone (i.e. the distribution zone), each of which is made of one zone hub and zero to finite number of zone speakers (i.e. zone media player). Outside the speaker zones, the media controller establishes and maintains out-of-zone data, control, and status update paths with each of the zone hubs. Inside each speaker zone, the zone hub establishes and maintains in-zone data, control, and status update paths with each of the zone speakers. The operation of a WMRA speaker zone comprises steps of receiving musical content by the zone hub from a content source through the out-of-zone data path and synchronously redistribute to each of the zone speakers through corresponding in-zone data paths. The operation of a WMRA zone hub also comprises steps of relaying control messages received from the media controller over the out-of-zone control path to individual zone speakers over the in-zone control paths. The operation of a WMRA zone hub further comprises steps of relaying status update messages received from individual zone speakers over in-zone status update paths to the media controller over out-of-zone status update path.

Figure 11:
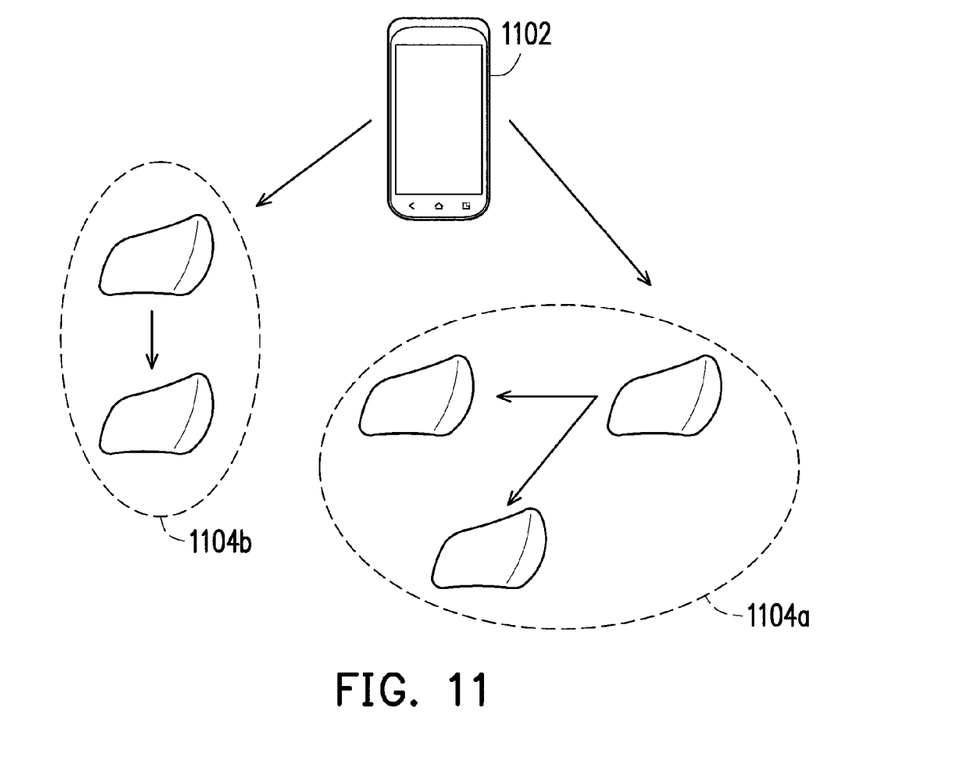
FIG. 11 is a schematic diagram showing a multimedia data distribution system according to another embodiment of the present invention.

In the previous embodiment shown in FIG. 1, there is one distribution zone 104 in the multimedia data distribution system 100. However, the number of the distribution zone 104 in a multimedia data distribution system 100 does not limit the scope of the present invention. FIG. 11 is a schematic diagram showing a multimedia data distribution system according to one embodiment of the present invention. In the embodiment shown in FIG. 11, a multimedia controller 1102 can control more than one distribution zones (such as the distribution zones 1104*a* and 1104*b*) even though the connection topologies of these distribution zones are different from each other. That is, the connection topology (such as the Wi-Fi Direct peer-to-peer connection, the infrastructure Wi-Fi connection or the Bluetooth-low-energy connection) of the distribution zone 1104*a* may be different from that of the distribution zone 1104*b*. However, they all can connect to the same multimedia controller 1102.

Figure 12:
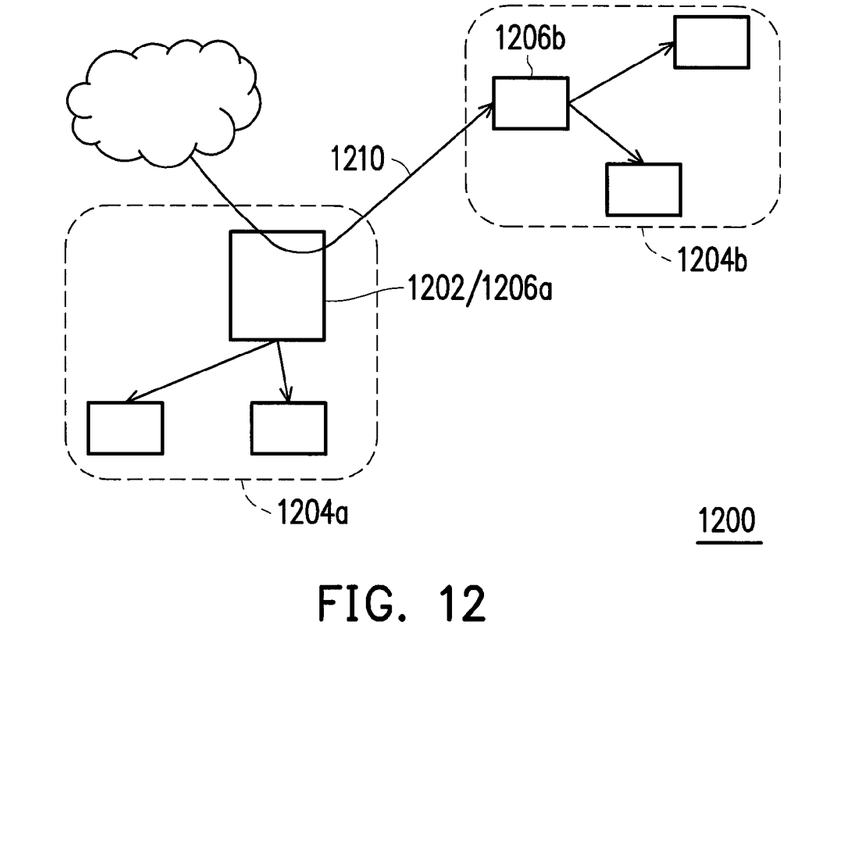
FIG. 12 presents a variation to the multimedia data zone system topology in FIG. 11 according to the other embodiment of the present invention.

In the previous embodiments shown in FIG. 1 and FIG. 11, a multimedia controller not only can control one or more distribution zones but may also be the content source of one or more distribution zones. However, the functions of the multimedia controller are not limited thereto. FIG. 12 presents a variation to the multimedia data zone system topology in FIG. 11 according to the other embodiment of the present invention. As shown in FIG. 12, there are a first distribution zone 1204*a* and a second distribution zone 1204*b* in the multimedia data distribution system 1200. Multimedia controller 1202, which is the controller of both of the first distribution zone 1204*a* and the second distribution zone 1204*b*, is also the zone hub 1206*a* of the first distribution zone 1204*a*. More specifically, multimedia controller 1202 assumes the functionalities of multimedia controller, zone hub, and content source in the first distribution zone 1204*a* while concurrently controlling and bridging content source to the second distribution zone 1204*b*.

Figure 13:
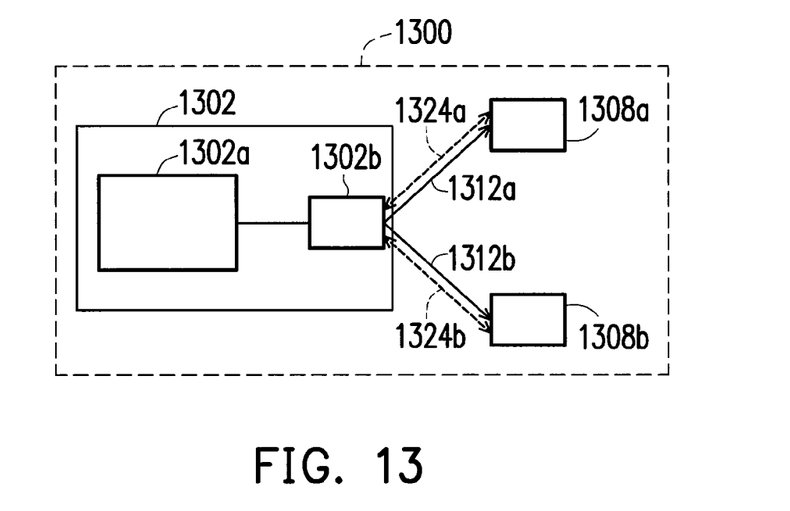
FIG. 13 is a schematic diagram showing a multimedia data distribution system according to the other embodiment of the present invention.

FIG. 13 is a schematic diagram showing a multimedia data distribution system according to the other embodiment of the present invention. As shown in FIG. 13, in the present embodiment, the multimedia data distribution system 1300 comprises a multifunctional central device (MCD) 1302. The MCD 1302 has the combined functionalities of a multimedia controller, a multimedia content source, and a zone hub. Furthermore, the MCD 1302 can be, for example, a portable device such as a smart phone, a personal digital assistant, a tablet PC, or a laptop. More clearly, this multimedia distribution system is centered on the MCD 1302. The multimedia data distribution system 1300 of the present embodiment further comprises at least one zone media player (in the present embodiment, there are two zone media players 1308*a* and 1308*b*). Moreover, the MCD 1302 can have, for example, a multimedia controller 1302*a* and a zone hub 1302*b* built therein. In other words, the multimedia controller 1302*a* is integrated with the zone hub 1302*b* in the MCD 1302. An in-zone data path (labeled as 1312*a* and 1312*b* respectively), which is a Wi-Fi Direct peer-to-peer connection, is established between the zone hub 1302*b* and each of the zone media players 1308*a* and 1308*b*. The in-zone control and status update paths (labeled as 1324*a* and 1324*b* respectively) are also based on Wi-Fi Direct peer-to-peer connections between the zone hub 1302*b* and individual zone media player(s). The zone hub 1302*b* will relay control messages to each of the zone media players 1308*a* and 1308*b* and status update messages back to the multimedia controller 1302*a*. The out-of-zone data, control, and status update paths between the zone hub 1302*b* and the multimedia controller 1302*a* are all internal to the MCD and function the same way as they do in discrete implementations. The MCD provides Internet connectivity to the distribution zone via infrastructure AP or wide area network (WAN) connections.

In one embodiment, the multimedia data distribution system having the MCD can be, for example, configured to comprise a first distribution zone and a second distribution zone. That is, there are more than one distribution zones within one multimedia data distribution system having the MCD. In this multimedia distribution system, the MCD plays multiple roles. For the first distribution zone, the MCD is the multimedia controller and Wi-Fi Hotspot that provides Internet connectivity to the zone hub. For the second distribution zone, the MCD functions as mentioned in the previous embodiment shown in FIG. 13.

In the embodiment shown in FIG. 13, the MCD has the combined functionalities of a multimedia controller, a multimedia content source, and a zone hub. However, the present invention is not limited by the functionalities of the MCD. In another embodiment of the present invention, the multimedia controller of the MCD maybe a local content source or is connected with the content source through an infrastructure Wi-Fi connection or wide area network (WAN) connection.

In the present invention, the multimedia data transmission, the control message transmission, the status update message transmission, and the discovery operation of the multimedia data distribution system remain fully functional in absence of the infrastructure access point. Further, the connections for transmitting signals between the controller, the zone hub and the zone media players may be established in different ways based on network topology and device capabilities.

It will be apparent to those skilled in the art that various modifications and variations can be made to the structure of the present invention without departing from the scope or spirit of the invention. In view of the foregoing descriptions, it is intended that the present invention also cover modifications and variations of this invention if they fall within the scope of the following claims and their equivalents.

What is claimed is:

1. A multimedia data distribution system, comprising:
a multimedia content source;
a multimedia controller; and
at least one distribution zone, comprising:
  a zone hub, receiving multimedia data from the multimedia content source through an out-of-zone data path; and
  at least one zone media players, wherein each of the at least zone media player directly receives the multimedia data from the zone hub through an in-zone data path, wherein each of the in-zone data path is a wireless peer-to-peer connection,
wherein a plurality of direct control and status update paths are respectively established between the multimedia controller and the zone hub and between the multimedia controller and each of the zone media players and, a control message and status update message are directly exchanged between the multimedia controller and the zone hub or one of the zone media players or the entire distribution zone through the corresponding direct control and status update paths.

2. The multimedia data distribution system of claim 1, wherein the multimedia controller is integrated with the zone hub in a portable device.

3. The multimedia data distribution system of claim 1, wherein the out-of-zone data path includes a Wi-Fi connection through an infrastructure AP or a Wi-Fi Hotspot, or a Wi-Fi peer-to-peer device.

4. The multimedia data distribution system of claim 1, wherein each of the in-zone data paths is a Wi-Fi Direct peer-to-peer connection.

5. The multimedia data distribution system of claim 1, wherein an out-of-zone control path is established between the multimedia controller and the zone hub and the out-of-zone control path includes a Wi-Fi bidirectional data connection established through an infrastructure AP, or a Wi-Fi Hotspot, or a Wi-Fi peer-to-peer device.

6. The multimedia data distribution system of claim 5, wherein an in-zone control path is established directly between the zone hub and each of the zone media players over the Wi-Fi Direct peer-to-peer connection, and when a control message arrives at the zone hub via the out-of-zone control path, the zone hub determines whether the control message is destined to the zone hub itself or one of the zone media players or the entire distribution zone, and the control message is terminated at the zone hub as it is destined to the zone hub, or the control message is relayed to the destined zone media player by the zone hub over the corresponding in-zone control path as the control message is destined to the zone media player, or the control message is relayed to each of the zone media players or broadcasted to them altogether as the control message is destined to the entire distribution zone.

7. The multimedia data distribution system of claim 1, wherein an out-of-zone status update path is established between the multimedia controller and the zone hub over a Wi-Fi data connection through an infrastructure AP, or a Wi-Fi Hotspot, or a Wi-Fi peer-to-peer device.

8. The multimedia data distribution system of claim 7, wherein an in-zone status update path is established between the zone hub and each of the zone media players over the Wi-Fi Direct peer-to-peer connection, and the zone hub aggregates status update messages respectively received from the zone media players and relays to the multimedia controller periodically via the out-of-zone status update path.

9. The multimedia data distribution system of claim 1, wherein each of the control and status update paths includes a bidirectional Bluetooth-low-energy connection.

10. The multimedia data distribution system of claim 1, wherein the at least distribution zone comprises a first distribution zone and a second distribution zone, and the multimedia controller is the zone hub of the first distribution zone for relaying the multimedia data to the zone hub of the second distribution zone.

11. The multimedia data distribution system of claim 1, wherein the multimedia controller is a content source or is connected with the content source through an infrastructure WiFi or wide area network (WAN) connection.

12. A multimedia data distribution system, comprising:
a portable device having a multimedia controller and a zone hub, wherein the multimedia controller is integrated with the zone hub in the portable device; and
at least a zone media player, wherein an in-zone data path is established between the portable device and each of the zone media player, and each of the zone media player directly receives multimedia data from the zone hub in the portable device through the in-zone data path, wherein each of the in-zone data path is a wireless peer-to-peer connection
wherein a plurality of direct control and status update paths are respectively established between the portable device and each of the zone media players and, a control message and status update message are directly exchanged between the portable device and one of the zone media players through the corresponding direct control and status update paths.

13. The multimedia data distribution system of claim 12, wherein an in-zone control and status update path is established directly between the zone hub and each of the zone media player.

14. The multimedia data distribution system of claim 13, wherein each of the in-zone data, control and status update paths include the Wi-Fi Direct peer-to-peer connection.

15. An operating method for a multimedia data distribution system, wherein the data distribution system includes a multimedia content source, a multimedia controller and at least one distribution zone, each of the at least distribution zone has a zone hub and at least one zone media player, an in-zone data path is established between the zone hub and each of the zone media player, and an out-of-zone data path is established between the multimedia controller and the zone hub of each of the at least distribution zone, the operating method comprising:
a multimedia data transmission operation including receiving multimedia data by the zone hub through the out-of-zone data path and directly redistributing the received multimedia data by the zone hub to each of the zone media player through the corresponding in-zone data path, wherein each of the in-zone data path is a wireless peer-to-peer connection
wherein a plurality of direct control and status update paths are respectively established between the multimedia controller and the zone hub and between the multimedia controller and each of the zone media players, and the operating method further comprises a control message transmission operation comprising:
directly exchanging a control message and the status update message between the multimedia controller and the zone hub or one of the zone media players or the entire distribution zone through the corresponding direct control and status update paths.

16. The operating method of claim 15, wherein the out-of-zone data path includes a Wi-Fi connection through an infrastructure AP or a Wi-Fi Hotspot, or a Wi-Fi peer-to-peer device.

17. The operating method of claim 15, wherein an out-of-zone control path is established between the multimedia controller and the zone hub, an in-zone control path is established directly between the zone hub and each of the zone media players over the Wi-Fi Direct peer-to-peer connection, and the operating method further comprises a control message transmission operation comprising:
determining by the zone hub whether a control message is destined to the zone hub itself or one of the zone media players or the entire distribution zone when the control message arrives at the zone hub via the out-of-zone control path;
terminating the control message at the zone hub when the control message is destined to the zone hub;
relaying the control message by the zone hub to the destined zone media player over the corresponding in-zone control path when the control message is destined to the zone media player; and
relaying or broadcasting the control message by the zone hub to each of the zone media players when the control message is destined to the entire distribution zone.

18. The operating method of claim 17, wherein the out-of-zone control path includes a Wi-Fi bidirectional data connection established through an infrastructure AP, or a Wi-Fi Hotspot, or a Wi-Fi peer-to-peer device.

19. The operating method of claim 15, wherein an out-of-zone status update path is established between the multimedia controller and the zone hub over a Wi-Fi data connection through an infrastructure AP, or a Wi-Fi Hotspot, or a Wi-Fi peer-to-peer device, an in-zone status update path is established between the zone hub and each of the zone media players over the WiFi Direct peer-to-peer connection, and the operating method further comprises a status updating operation comprises:
aggregating status update messages respectively from the zone media players by the zone hub;

relaying the status update messages to the multimedia controller periodically via the out-of-zone status update path.

20. The operating method of claim 15, wherein each of the control and status update paths includes a bidirectional Bluetooth-low-energy connections.

21. The operating method of claim 15, further comprising a status-updating operation, wherein the status updating operation comprises:
   sending a status update message by each of the zone media players to the multimedia controller through the corresponding status update path.

22. The operating method of claim 15, further comprising a discovery operation, wherein the discovery operation comprises:
   sending probe requests by the multimedia controller on a plurality of Wi-Fi channels; and
   sending a probe response by each of the zone media players to the multimedia controller in response to the probe requests received by each of the zone media players.

23. The operating method of claim 15, further comprising a discovery operation, wherein the discovery operation comprises:
   periodically sending undirected Bluetooth-low-energy advertisements by each of the zone hub and the zone media players on a plurality of predetermined advertisement channels; and
   scanning the predetermined advertisement channels by the multimedia controller for the undirected Bluetooth-low-energy advertisements.

* * * * *